US012701177B2

(12) United States Patent
Kheraj et al.

(10) Patent No.: US 12,701,177 B2
(45) Date of Patent: Aug. 4, 2026

(54) PER PACKET EDITING OF REPLICATED TRAFFIC FOR MONITORING AND ANALYSIS

(71) Applicant: Arista Networks, Inc., Santa Clara, CA (US)

(72) Inventors: Stefan Kheraj, Burnaby (CA); Graeme Rennie, Dublin (IE); James C. Pang, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 809 days.

(21) Appl. No.: 18/158,581

(22) Filed: Jan. 24, 2023

(65) Prior Publication Data

US 2024/0251030 A1    Jul. 25, 2024

(51) Int. Cl.
*H04L 69/22*        (2022.01)
*H04L 43/12*        (2022.01)
(52) U.S. Cl.
CPC .............. *H04L 69/22* (2013.01); *H04L 43/12* (2013.01)
(58) Field of Classification Search
CPC ................................ H04L 69/22; H04L 43/12
See application file for complete search history.

(56) References Cited

U.S. PATENT DOCUMENTS

| | | | |
|---|---|---|---|
| 8,594,087 B2 * | 11/2013 | Singh .................. | H04L 12/4641 370/390 |
| 10,038,624 B1 * | 7/2018 | Cruz ........................ | H04L 45/16 |
| 10,735,337 B1 * | 8/2020 | Matthews ............... | H04L 47/30 |
| 10,911,353 B2 * | 2/2021 | Sharma ................... | H04L 45/64 |
| 2007/0297406 A1 * | 12/2007 | Rooholamini ........ | H04L 12/185 370/432 |
| 2014/0044129 A1 * | 2/2014 | Mentze ............... | H04L 12/4625 370/390 |
| 2016/0099857 A1 * | 4/2016 | Begwani ................. | H04L 43/20 370/252 |
| 2018/0102963 A1 * | 4/2018 | Schmidt .................. | G06F 16/27 |
| 2018/0102965 A1 * | 4/2018 | Hari ........................ | H04L 12/185 |
| 2018/0139066 A1 * | 5/2018 | Nguyen ................ | H04L 49/901 |
| 2020/0382412 A1 * | 12/2020 | Chandrappa ........ | H04L 12/1877 |
| 2023/0036715 A1 * | 2/2023 | Sinha ................... | H04L 12/1804 |
| 2023/0038749 A1 * | 2/2023 | Bahadur .............. | H04L 49/113 |
| 2023/0231792 A1 * | 7/2023 | Hoffman ................. | H04L 43/10 370/242 |

* cited by examiner

*Primary Examiner* — Blake J Rubin
(74) *Attorney, Agent, or Firm* — Fountainhead Law Group, PC

(57) ABSTRACT

A network device replicates a received packet for delivery to one or more analytical tools according to a list of entries called a multicast group that is associated with the received packet. Each entry in the multicast group is associated with an egress port on the network device and with one or more packet editing actions. For each entry in the multicast group, the received packet is replicated, edited according to the associated packet editing actions, and egressed on the associated egress port.

19 Claims, 5 Drawing Sheets

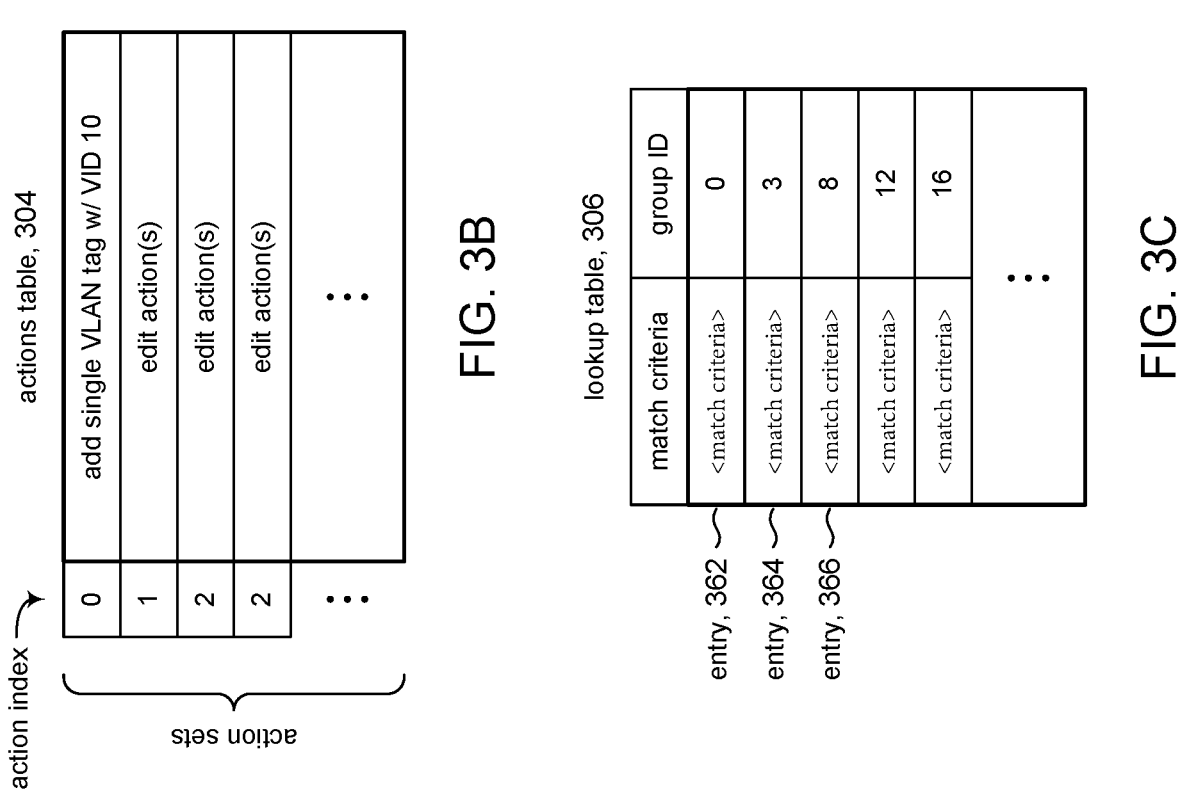
FIG. 3B
FIG. 3C
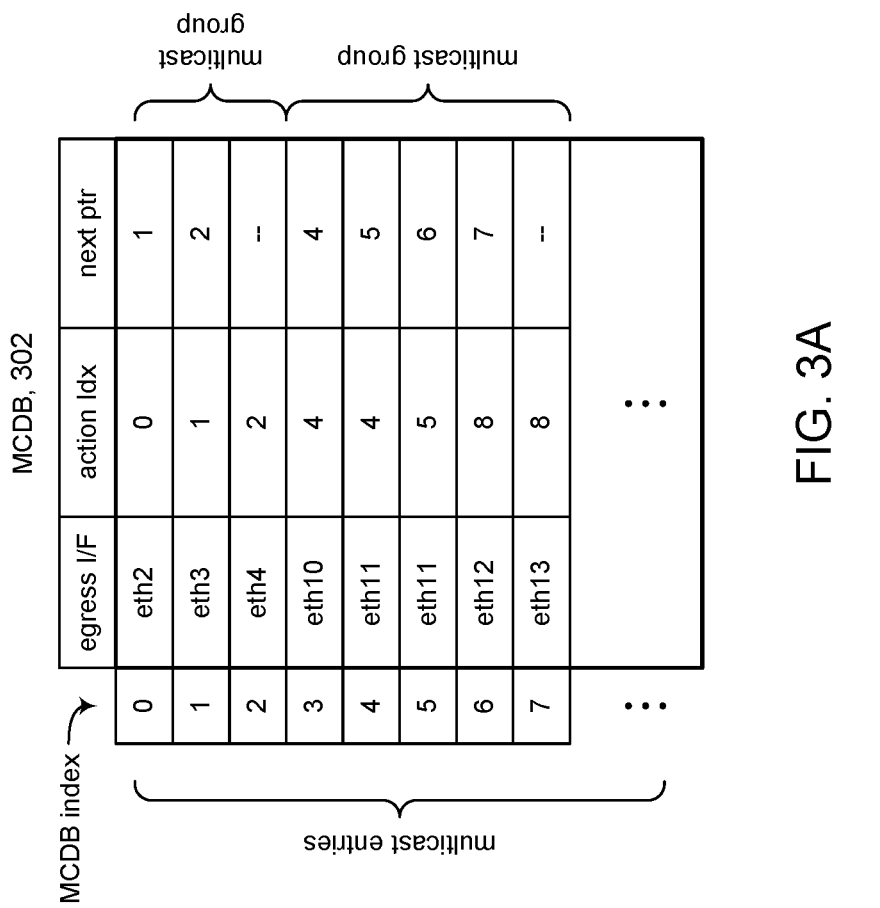
FIG. 3A

PER PACKET EDITING OF REPLICATED TRAFFIC FOR MONITORING AND ANALYSIS

CROSS REFERENCE TO RELATED APPLICATIONS

This application is related to U.S. application Ser. No. 17/716,719, filed Apr. 8, 2022, entitled "Media Access Control Address Rewrite Using Egress Header Editing In Traffic Aggregation Mode", the content of which is incorporated herein by reference in its entirety for all purposes.

BACKGROUND

The present disclosure relates to TAP (test access point) aggregators. TAP aggregation is a feature that allows a network administrator to capture and analyze/monitor traffic in a production network. Packets in the traffic of interest can be identified and replicated to one or more analytical/monitoring nodes ("tools"). Within a large organization, there may be multiple network management groups that require access to traffic from the same network device (switch, router, gateway, etc.) for different purposes; e.g., network security, analysis, debugging, route visibility, etc. The tool or tools used by each group may have different requirements for how packets in the monitored traffic should be edited depending on the software being used to process it. The location of the analytical node relative to the TAP aggregation device (TAP aggregator) might also dictate how the packets that constitute the monitored traffic should be edited. In these cases, additional hardware can be installed to deliver the traffic in the required format to each group. This can involve installing a hierarchical network of TAP aggregation devices to accommodate requirements of the different groups, or using additional physical interconnects (front panel patching) to replicate and manipulate the traffic before sending it out to each group.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 3A, 3B, 3C are representations of data tables in accordance with the present disclosure.

DETAILED DESCRIPTION

A network device in accordance with the present disclosure, can include TAP aggregation capability to apply different packet editing actions (e.g., adding, modifying, or removing headers) to the captured traffic on a per analytical tool basis to provide TAP aggregation functionality. The packet editing actions can be specific to the needs and requirements of the targeted analytical tool. Consider an MPLS (multi-protocol label switching) deployment, for example. For a real time analyzer, a user may want the packet editing actions to replace the MPLS labels with VLAN IDs (virtual local area network identifiers) in order to identify where in the network the packets were captured. On the other hand, the packet editing actions for a packet recorder might be to preserve the MPLS labels, but to add a timestamp.

A network device in accordance with the present disclosure can edit the captured traffic according to one set of packet editing actions to produce packets for one analytical/monitoring tool (the real time analyzer) and apply a different set of packet editing actions to the captured traffic to produce packets for another analytical/monitoring tool (the packet recorder).

A network device in accordance with some embodiments can include a multicast configuration database (MCDB) to support individualized packet replication and editing. Entries in the MCDB can be grouped into multicast groups. Each multicast group can be a linked list of entries in the MCDB, where each entry corresponds to an analytical tool. A packet to be replicated can be associated with a group ID that points to one of the multicast groups. Each entry in a multicast group can include an egress port for egress to the analytical tool to which the replicated packet is transmitted, an action set that specifies one or more actions, and a reference to the next entry in the multicast group.

In accordance with some embodiments, the action set in a given entry in a multicast group can contain one or more edit actions to be applied to the replicated packet before the packet is transmitted on the egress port (i.e., to the analytical tool) specified in the given entry. In accordance with various embodiments, the actions for one entry in the multicast group can be selected independently of actions in other entries in the multicast group. Edit actions can be selected specifically for the tool to which the packets are transmitted.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
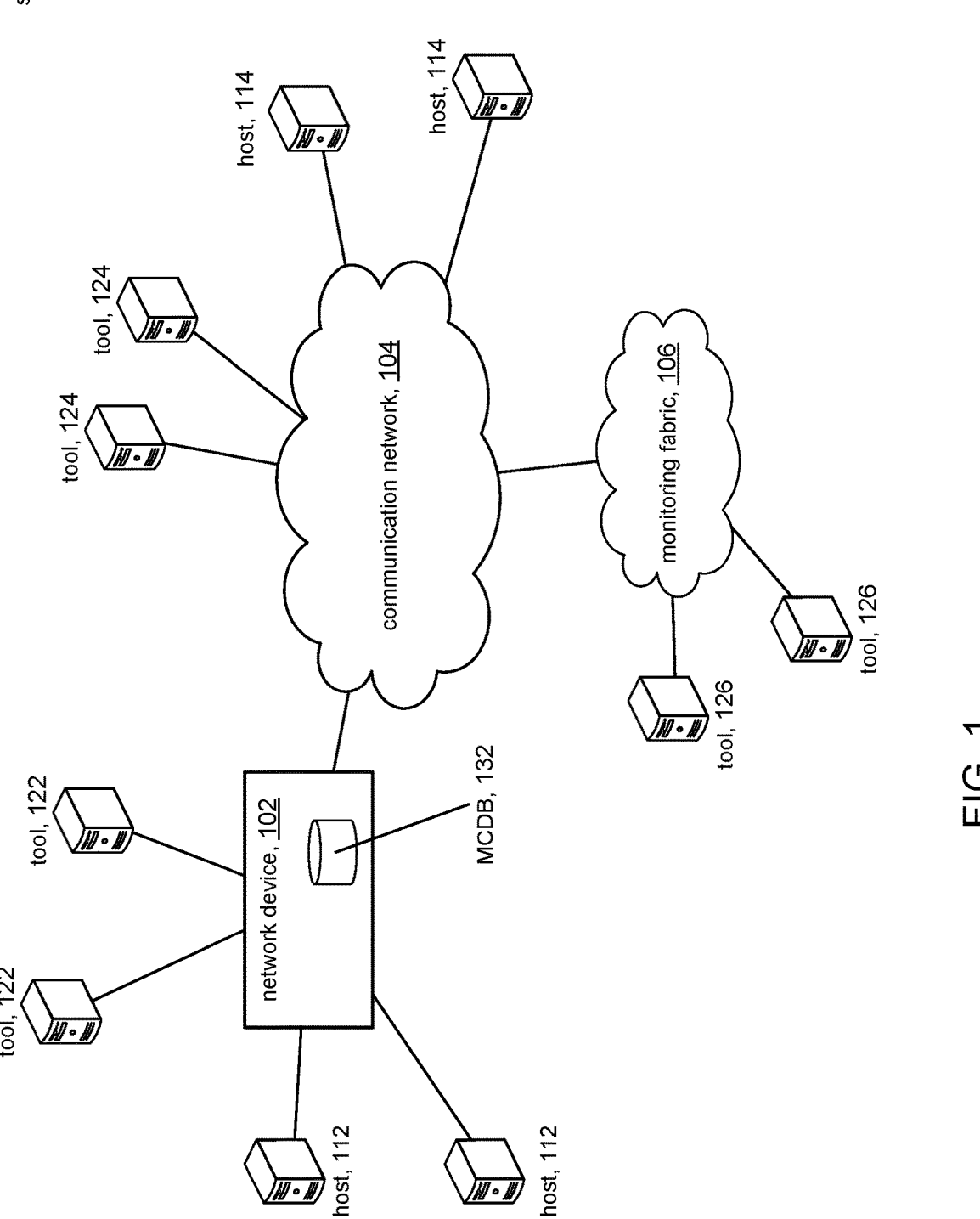
FIG. 1 represents a network device in accordance with the present disclosure deployed in a production system.

FIG. 1 shows a network device 102 in accordance with the present disclosure deployed in a networked system 100. Network device 102 can provide communication among host machines 112, 114, locally (hosts 112) or via a connection to communication network 104 (hosts 114). Network device 102 can receive, process, and forward packets among the host machines. Host machines include, but are not limited to, user computers, mobile devices, servers, etc.

Network device 102 can be configured to monitor the traffic (packets) that passes through the network device by a technique known as TAP (test access point) aggregation. The network device can replicate certain packets in the traffic flow and forward the replicated packets to various analytical tools such as packet analyzers, packet recorders, and the like. In some embodiments, analytical tools 122 can be local to the network device. In other embodiments analytical tools 124 can be accessed over communication network 104, where the network device can deliver monitored traffic to analytical tools 124 via communication network 104. In still other embodiments, analytical tools 126 can be deployed in a monitoring fabric. FIG. 1 shows a monitoring fabric 106 to which network device 102 can deliver monitored traffic via communication network 104. Although not shown in FIG. 1, it will be appreciated that in some embodiments the monitoring fabric can be local to network device 102.

Different network management groups in an enterprise may employ different analytical tools which may impose specific requirements for how the monitored traffic should be edited, for example, to accommodate requirements on the software being used to analyze the traffic. The location of the analytical node relative to the network device that provides the monitored traffic (TAP aggregation device, TAP aggregator) might also dictate how the packet needs to be edited, and so on. In accordance with the present disclosure, the network device 102 can include a multicast database (MCDB) 132 to support editing of monitored traffic on a per packet basis. The MCDB 132 can include information that informs packet editing of the monitored traffic on a per packet basis. This aspect of the present disclosure is discussed in more detail below.

Figure 2:
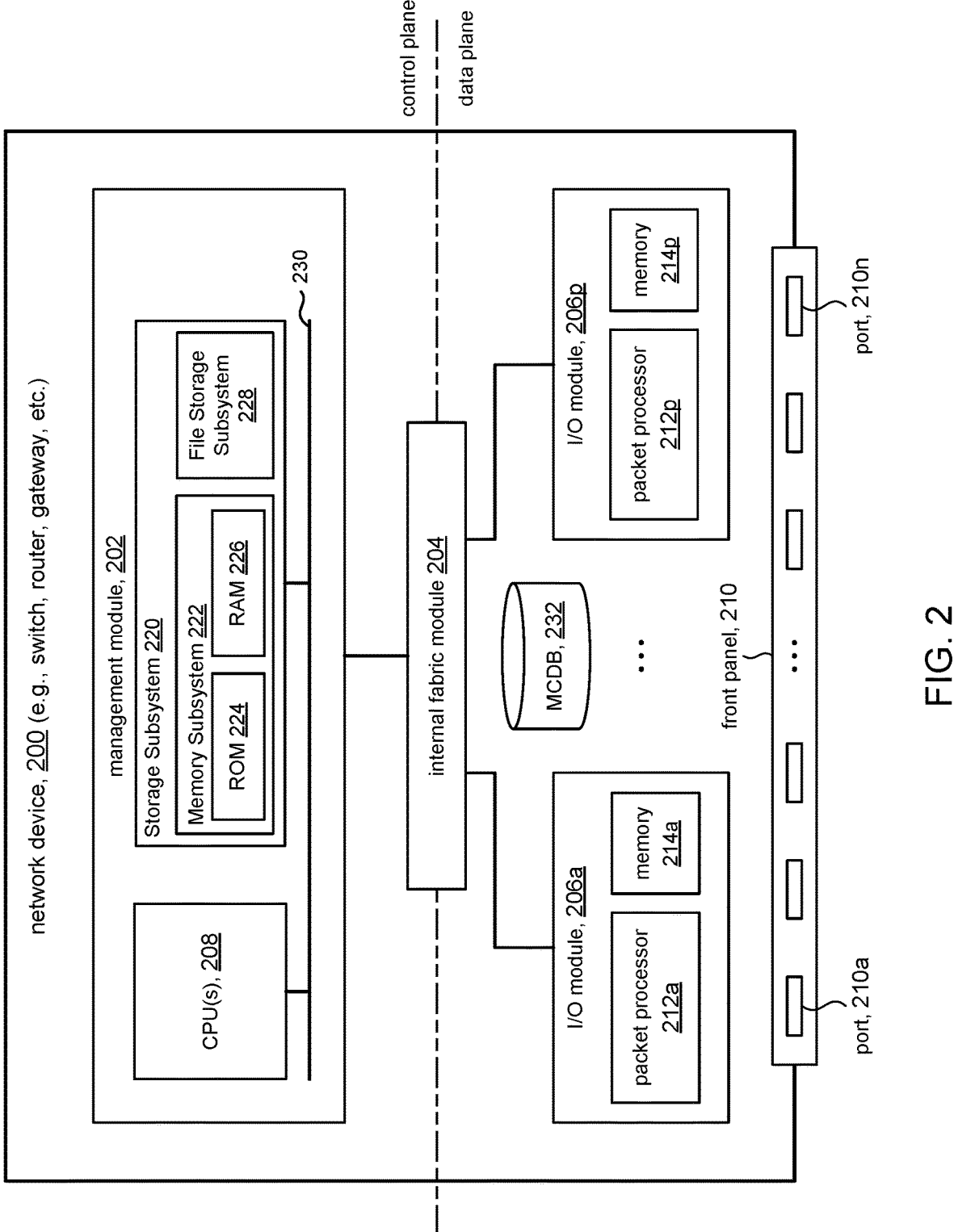
FIG. 2 is a schematic representation of a network device in accordance with the present disclosure.

FIG. 2 is a schematic representation of a network device 200 (e.g., a router, switch, firewall, gateway, and the like) in accordance with the present disclosure. In some embodiments, for example, network device 200 can include a management module 202, an internal fabric module 204, one or more I/O modules 206a-206p, and a front panel 210 of I/O ports (physical interfaces) 210a-210n. Management module 202 can constitute the control plane (also referred to as a control layer or simply the CPU) of network device 200 and can include one or more management CPUs 208 for managing and controlling operation of network device 200 in accordance with the present disclosure. Each management CPU 208 can be a general-purpose processor, such as an Intel®/AMD® x86, ARM® microprocessor and the like, that operates under the control of software stored in a memory device/chips such as ROM (read-only memory) 224 or RAM (random-access memory) 226. The control plane provides services that include traffic management functions such as routing, security, load balancing, analysis, and the like.

The one or more management CPUs 208 can communicate with storage subsystem 220 via bus subsystem 230. Other subsystems, such as a network interface subsystem (not shown in FIG. 2), may be on bus subsystem 230. Storage subsystem 220 can include memory subsystem 222 and file/disk storage subsystem 228, which represent non-transitory computer-readable storage devices that can store program code and/or data, which when executed by one or more management CPUs 208, can cause one or more management CPUs 208 to perform operations in accordance with embodiments of the present disclosure.

Memory subsystem 222 can include a number of memories such as main RAM 226 (e.g., static RAM, dynamic RAM, etc.) for storage of instructions and data during program execution, and ROM (read-only memory) 224 in which fixed instructions and data can be stored. File storage subsystem 228 can provide persistent (i.e., non-volatile) storage for program and data files, and can include storage technologies such as solid-state drive and/or other types of storage media known in the art.

Management CPUs 208 can run a network operating system stored in storage subsystem 220. A network operating system is a specialized operating system for network device 200. For example, the network operating system can be the Arista Extensible Operating System (EOS®), which is a fully programmable and highly modular, Linux-based network operating system, developed and sold/licensed by Arista Networks, Inc. of Santa Clara, California. Other network operating systems may be used.

Bus subsystem 230 can provide a mechanism for the various components and subsystems of management module 202 to communicate with each other as intended. Although bus subsystem 230 is shown schematically as a single bus, alternative embodiments of the bus subsystem can utilize multiple busses.

Internal fabric module 204 and the one or more I/O modules 206a-206p collectively represent the data plane of network device 200 (also referred to as data layer, forwarding plane, etc.). Internal fabric module 204 represents interconnections among the various other modules of network device 200. Each I/O module 206a-206p can include a packet processing pipeline, logically represented by respective packet processors 212a-212p and memory hardware 214a-214p, to provide packet processing and forwarding capability. Each I/O module 206a-206p can be further configured to communicate over one or more ports 210a-210n on the front panel 210 to receive and forward network traffic. Packet processors 212a-212p can comprise hardware (circuitry), including for example, data processing hardware such as an ASIC (application specific integrated circuit), FPGA (field programmable array), digital processing unit, and the like.

Memory hardware 214a-214p can include lookup hardware, for example, content addressable memory such as TCAMs (ternary CAMs) and auxiliary memory such as SRAMs (static RAM). The forwarding hardware in conjunction with the lookup hardware can provide wire speed decisions on how to process ingress packets and outgoing packets for egress. In accordance with some embodiments, the memory hardware can include MCDB 232. The MCDB 232 can be a shared memory, as depicted in FIG. 2, that can be accessed by packet processors 212a-212p. In other embodiments, MCDB 232 can be incorporated in each packet processor. In accordance with some embodiments, some aspects of the present disclosure can be performed wholly within the data plane.

FIGS. 3A, 3B, and 3C illustrate various data tables, including MCDB 302, action table 304, and lookup table 306, to support per packet editing of monitored traffic in accordance with the present disclosure. As noted above, the underlying hardware for these data tables can be based on but are not limited to memory architectures such as TCAM, algorithmic TCAM (ATCAM), exact match SRAM, etc. Information stored in the data tables can be specified by a user; e.g., via a suitable user interface such as a command line interface, a downloaded configuration file, and so on.

FIG. 3A shows details of an MCDB 302 in accordance with some embodiments. MCDB 302 comprises entries referred to herein as multicast (or replication) entries that correspond to analytical tools to which certain monitored traffic can be sent. In some embodiments, each multicast entry comprises data fields including an egress interface (I/F) field, an action index field, and a next pointer field. The egress I/F field identifies an egress interface for egressing the replica of a received packet. The egress interface can be connected to or otherwise be in communication with an analytical tool to which the packet replica is sent. The action index field identifies one or more packet editing actions to be performed on the replicated packet. The next pointer field identifies another entry in the MCDB. The next pointer field establishes a linked list of entries, referred to herein as a multicast group. The tail (last) multicast entry in a given multicast group can be designated by a suitable null or otherwise invalid value in the next pointer field. The head entry of the multicast group (e.g., multicast entry 0, multicast entry 3) can serve to identify the multicast group.

FIG. 3B represents an actions table 304 comprising action set entries. MCDB entries in the MCDB point to action set entries in the action table. For example, multicast entry 3 points to action set 4 in the action table, multicast entry 6 points to action set 8, and so on. Actions in an action set can include suitable packet editing actions, such as but not limited to:

add single VLAN tag with a user-specified VID (VLAN identifier)

add 2 VLAN tags with a user-specified VID (VLAN identifier)

remove 1 or 2 VLAN tags destination and/or source MAC address, IP address encapsulation; e.g., VxLAN (virtual extended LAN), GRE (generic routing encapsulation)

add time stamps extract a user-configurable number bytes from the start of the packet etc.

FIG. 3C represents a lookup table 306 comprising data fields including match criteria data and a group ID. The match criteria specify the traffic (i.e., data packets) to be replicated and forwarded to a packet analysis tool. Packets can be matched by match criteria that comprise parts of the packet, including but not limited to portions of the packet headers (e.g., MAC addresses, IP addresses, VLAN ID, and the like), portions of the payload, etc. The match criteria can include the port on the network device on which the packet is ingressed, and so on.

The group ID specifies an entry in the MCDB 302, and in particular specifies the head entry of one of the multicast groups in the MCDB. For instance, the group ID in entry 362 in the lookup table points to multicast entry 0 in the MCDB, which is the head entry of the multicast group comprising MCDB entries 0, 1, and 2. Likewise, the group ID in entry 364 in the lookup table points to multicast entry 3 in the MCDB, which is the head entry of the multicast group comprising entries 3, 4, 5, 6, and 7. Entry 366 points to a multicast group in the MCDB that begins with multicast entry 8, and so on.

Operations involving the data tables shown in FIGS. 3A-3C are discussed below.

Figure 4:
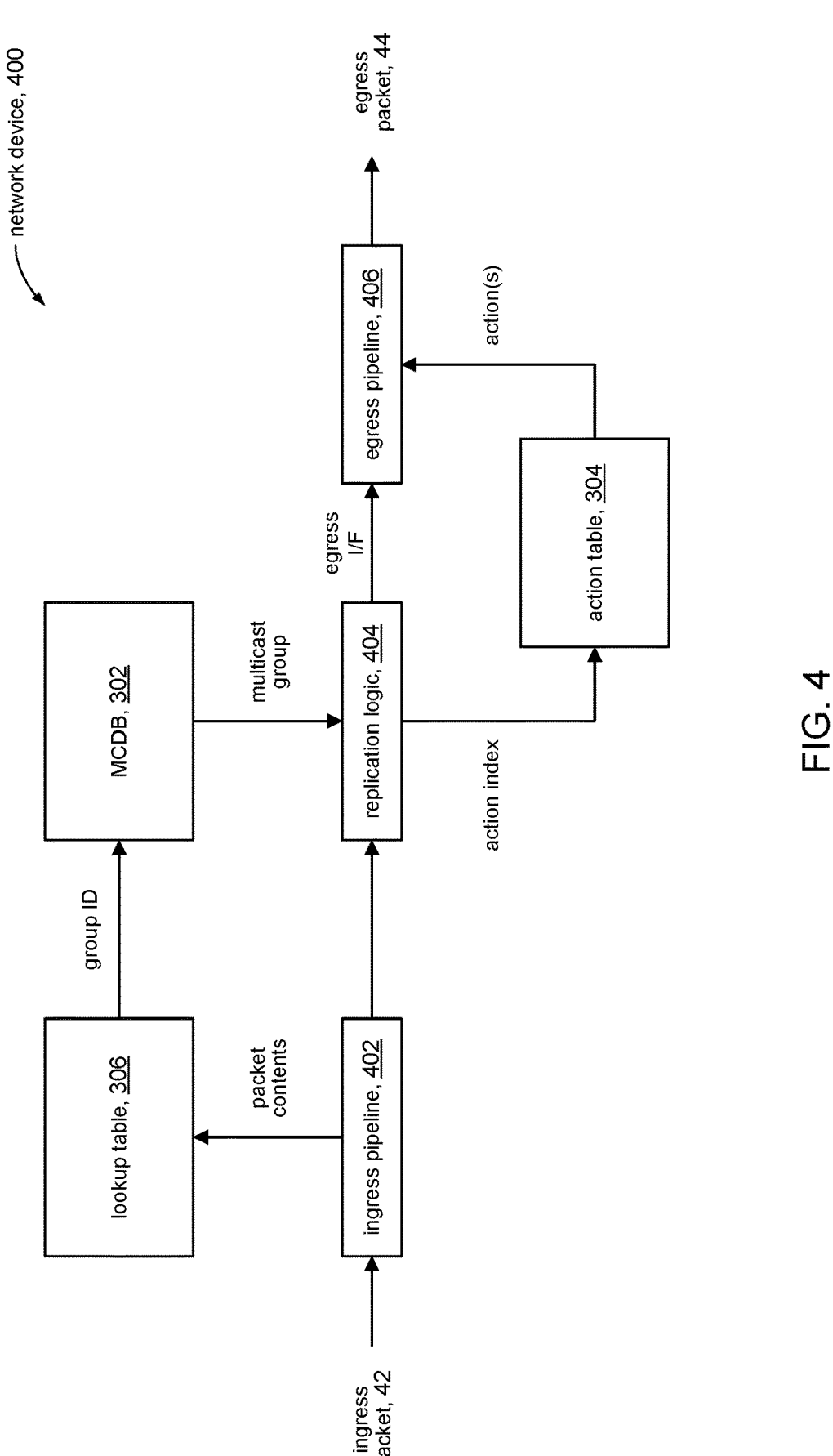
FIG. 4 is a diagrammatic illustration of components in a network device in accordance with the present disclosure.

FIG. 4 is a diagrammatic representation of components in network device 400 to process packets in accordance with the present disclosure. The components include ingress pipeline 402, replication logic 404, and egress pipeline 406. In various embodiments, each of the ingress pipeline, the replication logic, and the egress logic can comprise any suitable processing device and supporting chips, including but not limited to technologies such as FPGA, ASIC, data processing chips (e.g., CPU, etc.), and so on.

A packet 42 received by the network device 400 can proceed to ingress pipeline 402. Portions of the contents of the received packet can be provided to lookup table 306 (FIG. 3C) to identify a multicast group in MCDB 302 (FIG. 3A); e.g., via the multicast group ID contained in an entry found in lookup table 306.

The received packet can proceed to replication logic 404 where the replication logic can process the received packet for each entry in the multicast group. More specifically, for each multicast entry in the multicast group, the replication logic can replicate the received packet, identify actions (from action table 304) specified by the action index in the multicast entry, and output the egress I/F specified in the multicast entry to egress pipeline 406.

Each replicated packet can proceed to egress pipeline 406 where the replicated packet can be edited according to actions from the action table 304. The edited packet replica 44 can then be egressed on a port specified by the egress I/F received from the replication logic 404.

Figure 5:
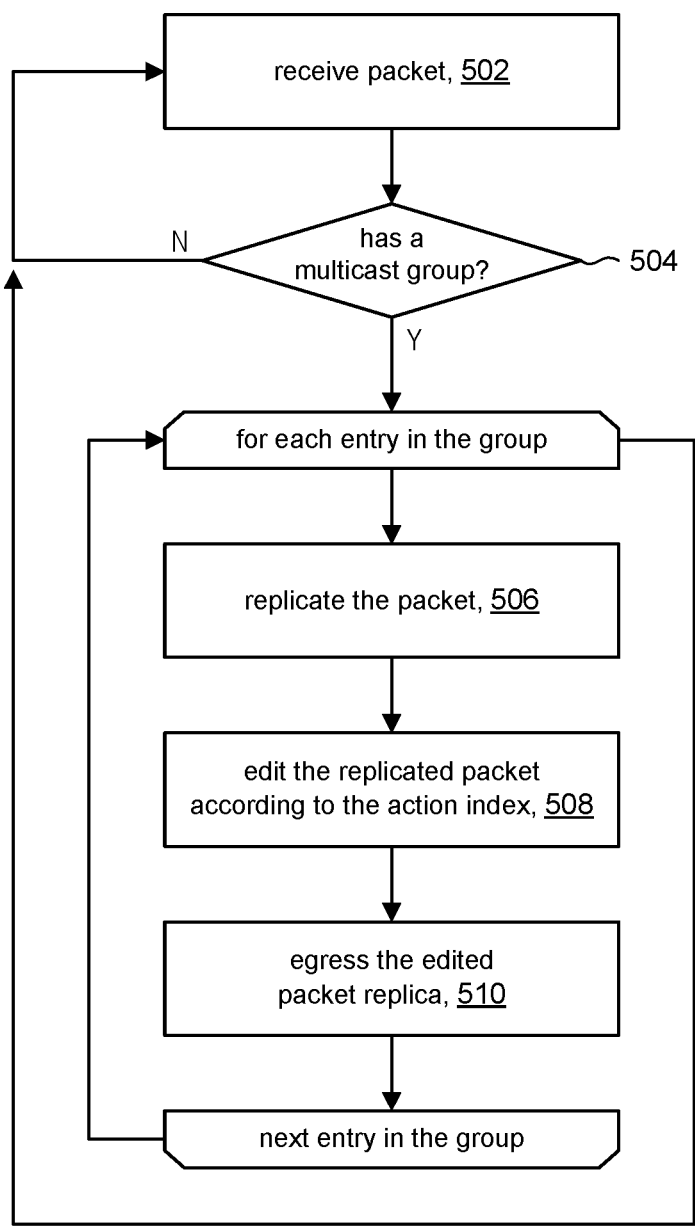
FIG. 5 is a flow of operations performed in a network device in accordance with the present disclosure.

Referring to FIG. 5, the discussion will now turn to a high-level description of processing in a network device (e.g., 102, FIG. 1) for TAP aggregation in accordance with the present disclosure. In some embodiments, for example, the network device can include one or more digital processing units (circuits), which when operated, can cause the network device to perform processing in accordance with FIG. 5. Digital processing units (circuits) in the control plane can include general CPUs that operate by way of executing computer program code stored on a non-volatile computer readable storage medium (e.g., read-only memory); for example, CPU 208 in the control plane (FIG. 2) can be a general CPU. Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 212a-212p in the data plane (FIG. 2) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the network device can receive a packet. For example, packets can be received from host machines (e.g., 112, FIG. 1) that are destined to other host machines (e.g., 112, 114). The network device can receive a packet (ingress) on one of its ports (the ingress port) and forward the packet (egress) on another of its ports (the egress port). For monitoring purposes, the received packet can be replicated one or more times and each packet replica can be processed and forwarded to an analytical tool.

At operation 504, the network device can determine if a multicast group is associated with the received packet. In accordance with the present disclosure, the multicast group can inform the egress pipeline (e.g., 406, FIG. 4) how to edit replicas of the received packet and where to send the edited replicas, e.g., to various analytical tools. In some embodiments, for example, the received packet can be applied to a lookup table (e.g., 306, FIG. 3C) to find a matching entry in the lookup table. The match criteria can be based on the ingress port, on information in the header(s) of the packet, the payload, and so on. For example, suppose a user wants to monitor packets that ingress on a given port on the network device. The user can program or otherwise store an entry in the lookup table where the match criteria is "ingress port=<port of interest>". Packets that originate from a certain device (e.g. source MAC address) can be monitored. Packets that are destined to a certain server (e.g., destination IP) can be monitored, and so on. If no entry (e.g., in lookup table 306) is found, this can indicate that traffic containing the received packet is not designated for monitoring. Processing can return to operation 502 to continue receiving another packet.

On the other hand, if an entry (e.g., in lookup table 306) is found, then the received packet can be deemed to be contained in traffic that is marked for monitoring. The multicast group identified in the found entry can be used to process the received packet. Referring to FIG. 3C as an illustrative example for the following discussion, suppose the received packet matches entry 364 in lookup table 306. The received packet can be processed in accordance with the multicast group comprising MCDB entries 3, 4, 5, 6, and 7 in accordance with the following FOR loop, where each entry in the multicast group can be processed as follows:

At operation 506, the network device can create a replica of the received packet (referred to variously as replicated packet, packet replica). The replicated packet can proceed to an egress pipeline to be processed for egress. In accordance with the present disclosure, the network device can extract the egress I/F from the current multicast entry and provide it to the egress pipeline. As noted above, the egress I/F can be connected to or otherwise be in communication with an analytical tool. The network device can extract the action index from the current multicast entry. The action index can be provided to the egress pipeline.

At operation 508, the network device can edit the replicated packet according to the action index from operation 506. In some embodiments, for example, the action index can specify an action set in action table 304 (FIG. 3B). The egress pipeline can edit the replicated packet in accordance with one or more actions in the action set; e.g., add/delete VLAN tags, modify IP addresses, and so on specified in the current multicast entry. As noted above, the replicated packet can be edited to accommodate requirements of the target analytical tool.

At operation 510, the network device can egress the edited packet replica on the egress port specified by the egress I/F data field of the current multicast entry to send the edited packet replica to the analytical tool associated with the egress port.

Processing of the received packet can return to the top of the FOR loop to process the next entry in the multicast group. Using our example above, where multicast group is the group identified by multicast entry 3, the FOR loop will first process multicast entry 3 to replicate the received packet according to action set 4 and transmit the edited packet replica to an analytical tool reachable on port "eth10". The next entry in the multicast group is multicast entry 4. Another replica of the received packet will be made and edited also according to action set 4, but this replicated packet will be transmitted on port "eth11". The received packet is again replicated for the next multicast entry 5, this time according to actions in action set 5 and transmitted on "eth11". Additional replicas are made, edited, and transmitted for MCDB entries 6 and 7. Multicast entry 7 is the last entry in the multicast group, so processing can return to operation 502 to continue receiving another packet after entry 7 is processed. This foregoing example emphasizes that actions can be the same or different from one multicast entry in a multicast group to another. Likewise, the destinations of the replicated packets can be the same or different from one multicast entry to another.

It can be seen that the multicast group associated with a received packet allows for the packet to be replicated for each entry. Each replicated packet can target a different (or the same) analytical tool by virtue of the egress I/F data field being different from one entry in the multicast group to the next. Each replicated packet can be edited independently of other replicated packets by virtue of the action index data field being specific to each entry in the multicast group. Processing in accordance with the present disclosure allows the network device itself to deliver monitored packets to analytical tools. The present disclosure provides a network device that can deliver customized packets to analytical tools without having to install additional TAP aggregation devices (which saves rack space and reduces energy costs) or patching the front panel (which saves ports on the front panel) to loop back a packet for a second pass through the packet processor.

FURTHER EXAMPLES

Features described above as well as those claimed below may be combined in various ways without departing from the scope hereof. The following examples illustrate some possible, non-limiting combinations:

(A1) A method in a network device for monitoring traffic between two nodes, the method comprising: receiving a packet among the traffic between the two nodes; identifying a multicast group associated with the received packet, the multicast group comprising a set of multicast entries; and processing the received packet for egress according to each multicast entry in the multicast group, including for a given multicast entry in the multicast group: generating a replica (packet replica) of the received packet; editing the packet replica according to an action set specified in the given multicast entry, the action set comprising one or more actions; egressing the edited packet replica on an interface specified in the given multicast entry; and repeating the foregoing for each multicast entry in the multicast group, wherein the received packet is replicated, edited, and egressed as many times as there are multicast entries in the set of multicast entries.

(A2) For the method denoted as (A1), a first multicast entry in the multicast group specifies an action set comprising actions that are different from actions in an action set specified in a second multicast entry in the multicast group.

(A3) For the method denoted as any of (A1) through (A2), a first multicast entry in the multicast group specifies an interface on the network device that is different from an interface specified in a second multicast entry in the multicast group.

(A4) For the method denoted as any of (A1) through (A3), a first multicast entry in the multicast group and a second multicast entry in the multicast group specify the same interface on the network device and specify the same action set.

(A5) For the method denoted as any of (A1) through (A4), a first multicast entry in the multicast group and a second multicast entry in the multicast group specify the same interface on the network device and specify different action sets.

(A6) For the method denoted as any of (A1) through (A5), the interfaces specified in the set of multicast entries are associated with packet analysis tools.

(A7) The method denoted as any of (A1) through (A6), further comprising performing a lookup on the received packet to identify the multicast group from among a plurality of multicast groups.

(A8) The method denoted as any of (A1) through (A7), further comprising: storing a plurality of multicast entries in a data store of the network device; and grouping the plurality of multicast entries in the data store into a plurality of linked lists of multicast entries, wherein the set of multicast entries of the multicast group is one of the plurality of linked lists of multicast entries in the data store.

(B1) A method in a network device, the method comprising: receiving a packet; identifying a set of replication entries that is associated with the received packet; for each given entry in the set of replication entries, replicate the received packet, edit the replicated packet according to edit actions associated with the given entry, and egress the edited replicated packet on a port of the network device associated with the given entry, wherein the set of replication entries is stored in a data store comprising a plurality of replication entries that are grouped into a plurality of sets of replication entries, wherein the set of replication entries is identified from among the plurality of sets of replication entries based on contents of the received packet.

(B2) For the method denoted as (B1), a first replication entry in the set of replication entries is associated with edit actions that are different from edit actions associated with a second replication entry in the set of replication entries.

(B3) For the method denoted as any of (B1) through (B2), a first replication entry in the set of replication entries is associated with a port on the network device that is different from a port that is associated with a second replication entry in the set of replication entries.

(B4) For the method denoted as any of (B1) through (B3), the first replication entry and the second replication entry are associated with the edit actions.

(B5) For the method denoted as any of (B1) through (B4), edits actions associated with replication entries in the set of replication entries are determined independently of one another.

(B6) For the method denoted as any of (B1) through (B5), the ports associated with replication entries in the set of replication entries are associated with packet analysis tools.

(C1) A network device comprising: a data storage device having stored therein a plurality of replication entries that are grouped into a plurality of groups of replication entries; and a data processing device. The data processing device is programmed to: receive a packet; identify a group of replication entries that is associated with the received packet from among the plurality of groups of replication entries; and for each given entry in the group of replication entries, replicate the received packet, edit the replicated packet according to edit actions associated with the given entry, and egress the edited replicated packet on a port of the network device associated with the given entry.

(C2) For the network device denoted as (C1), a first replication entry in the group of replication entries is associated with edit actions that are different from edit actions associated with a second replication entry in the group of replication entries.

(C3) For the network device denoted as any of (C1) through (C2), a first replication entry in the group of replication entries is associated with a port on the network device that is different from a port that is associated with a second replication entry in the group of replication entries.

(C4) For the network device denoted as any of (C1) through (C3), first and second replication entries in the group of replication entries are associated with the same port on the network device and the same edits actions.

(C5) For the network device denoted as any of (C1) through (C4), edit actions associated with replication entries in the group of replication entries are determined independently of one another.

(C6) For the network device denoted as any of (C1) through (C5), the data processing device is a data processor in a data plane of the network device.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for monitoring traffic between two nodes, the method comprising:
   receiving a packet among the traffic between the two nodes;
   identifying a multicast group associated with the received packet, the multicast group corresponding to a plurality of packet analysis tools and comprising a set of multicast entries, wherein each multicast entry corresponds to one of the packet analysis tools; and
   processing the received packet for egress according to each multicast entry in the multicast group, including for a given multicast entry in the multicast group:
   generating a replica (packet replica) of the received packet;
   editing the packet replica according to an action set specified in the given multicast entry, the action set comprising one or more actions that are specific to the packet analysis tool corresponding to the given multicast entry;
   egressing the edited packet replica on an interface specified in the given multicast entry; and
   repeating the foregoing for each multicast entry in the multicast group, wherein the received packet is replicated, edited, and egressed as many times as there are multicast entries in the set of multicast entries.

2. The method of claim 1, wherein a first multicast entry in the multicast group specifies an action set comprising actions that are different from actions in an action set specified in a second multicast entry in the multicast group.

3. The method of claim 1, wherein a first multicast entry in the multicast group specifies an interface on the network device that is different from an interface specified in a second multicast entry in the multicast group.

4. The method of claim 1, wherein a first multicast entry in the multicast group and a second multicast entry in the multicast group specify the same interface on the network device and specify the same action set.

5. The method of claim 1, wherein a first multicast entry in the multicast group and a second multicast entry in the multicast group specify the same interface on the network device and specify different action sets.

6. The method of claim 1, further comprising performing a lookup on the received packet to identify the multicast group from among a plurality of multicast groups.

7. The method of claim 1, further comprising:
   storing a plurality of multicast entries in a data store of the network device; and
   grouping the plurality of multicast entries in the data store into a plurality of linked lists of multicast entries, wherein the set of multicast entries of the multicast group is one of the plurality of linked lists of multicast entries in the data store.

8. A method in a network device, the method comprising:
receiving a packet;
identifying a set of replication entries that is associated with the received packet, wherein each entry in the set of replication entries corresponds to a packet analysis tool;
for each given entry in the set of replication entries, replicate the received packet, edit the replicated packet according to edit actions associated with the given entry, and egress the edited replicated packet on a port of the network device associated with the given entry, wherein the edit actions associated with the given entry are specific to the packet analysis tool corresponding to the given entry,
wherein the set of replication entries is stored in a data store comprising a plurality of replication entries that are grouped into a plurality of sets of replication entries, wherein the set of replication entries is identified from among the plurality of sets of replication entries based on contents of the received packet.

9. The method of claim 8, wherein a first replication entry in the set of replication entries is associated with edit actions that are different from edit actions associated with a second replication entry in the set of replication entries.

10. The method of claim 8, wherein a first replication entry in the set of replication entries is associated with a port on the network device that is different from a port that is associated with a second replication entry in the set of replication entries.

11. The method of claim 10, wherein the first replication entry and the second replication entry are associated with the edit actions.

12. The method of claim 8, wherein edits actions associated with replication entries in the set of replication entries are determined independently of one another.

13. The method of claim 8, wherein the ports associated with replication entries in the set of replication entries are associated with packet analysis tools.

14. A network device comprising:
a data storage device having stored therein a plurality of replication entries that are grouped into a plurality of groups of replication entries, wherein each group of replication entries corresponds to a packet analysis tool; and
a data processing device programmed to:
receive a packet;
identify a group of replication entries that is associated with the received packet from among the plurality of groups of replication entries; and
for each given entry in the group of replication entries, replicate the received packet, edit the replicated packet according to edit actions associated with the given entry, and egress the edited replicated packet on a port of the network device associated with the given entry, wherein the edit actions associated with the given entry are specific to the packet analysis tool corresponding to the group of replication entries.

15. The network device of claim 14, wherein a first replication entry in the group of replication entries is associated with edit actions that are different from edit actions associated with a second replication entry in the group of replication entries.

16. The network device of claim 14, wherein a first replication entry in the group of replication entries is associated with a port on the network device that is different from a port that is associated with a second replication entry in the group of replication entries.

17. The network device of claim 14, wherein first and second replication entries in the group of replication entries are associated with the same port on the network device and the same edits actions.

18. The network device of claim 14, wherein edit actions associated with replication entries in the group of replication entries are determined independently of one another.

19. The network device of claim 14, wherein the data processing device is a data processor in a data plane of the network device.

* * * * *